No. 647,441. Patented Apr. 10, 1900.
F. L. CLAPP.
BICYCLE BRAKE.
(Application filed July 28, 1899.)
(No Model.) 2 Sheets—Sheet 1.
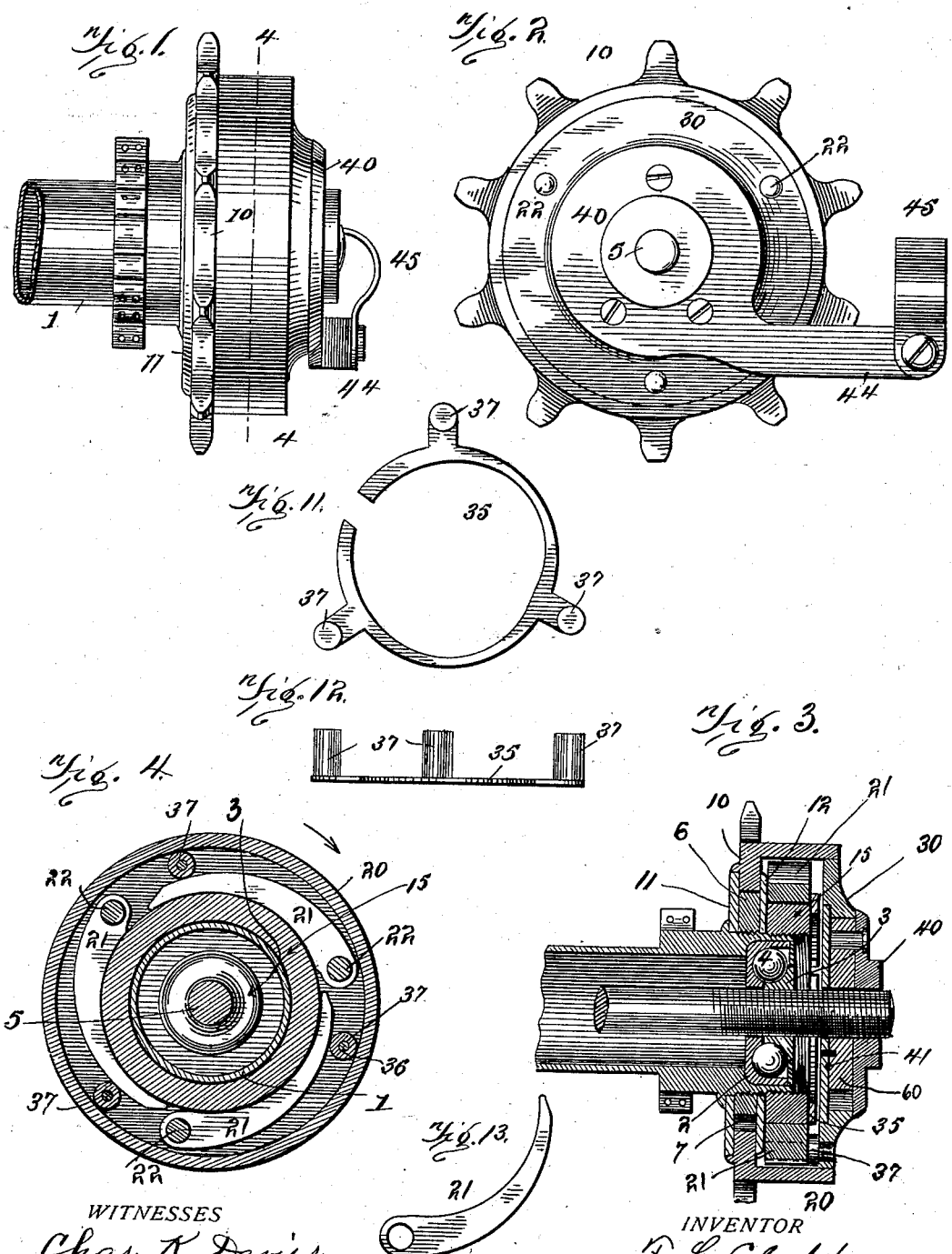
WITNESSES
Chas. K. Davis.
M. E. Brown.
INVENTOR
F. L. Clapp
By W. A. Bartlett
Attorney

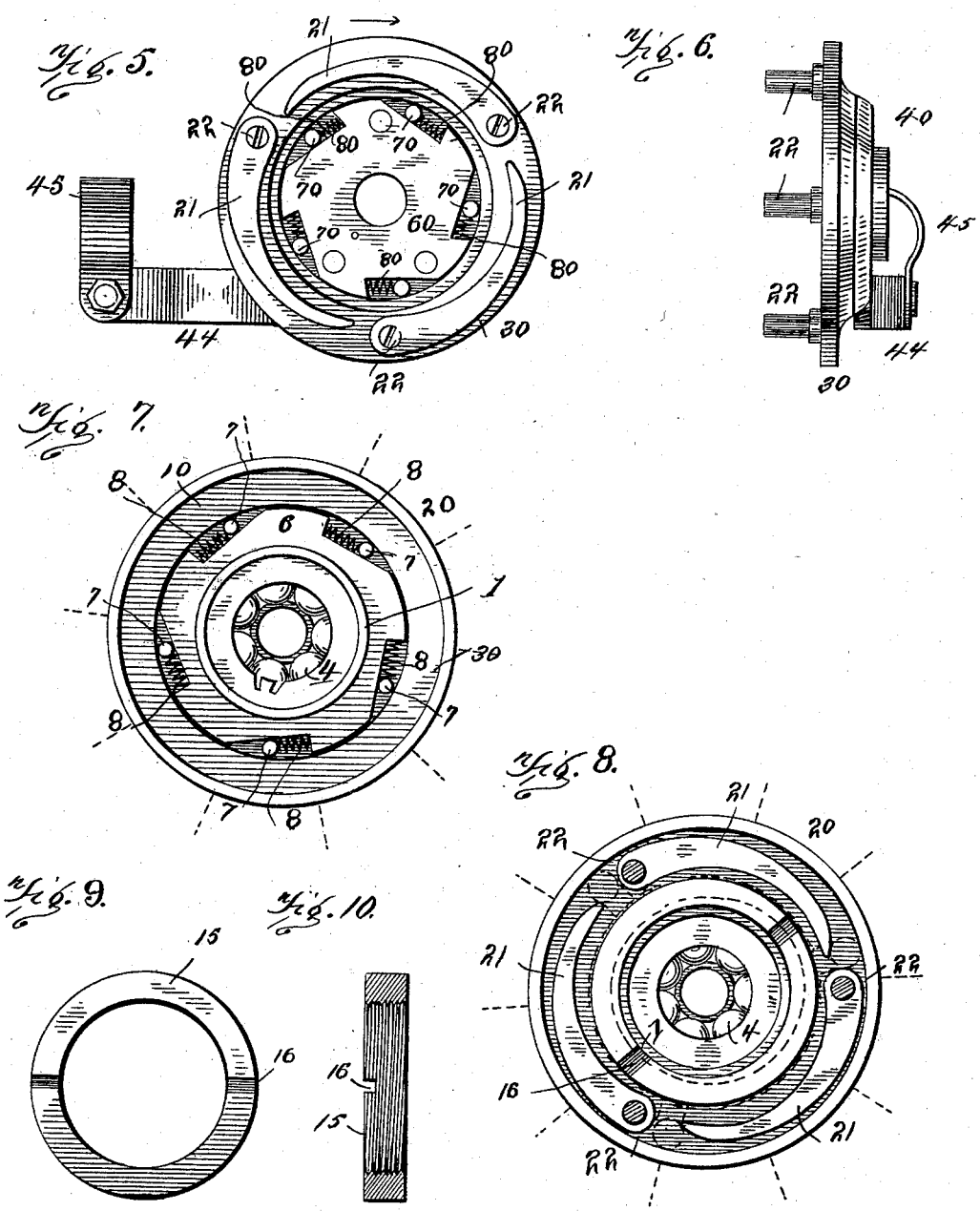

United States Patent Office.

FRANK L. CLAPP, OF NORTHAMPTON, MASSACHUSETTS, ASSIGNOR OF TWO-THIRDS TO GEORGE D. LYTLE, OF MIDDLETOWN, CONNECTICUT, AND HENRY A. PAULL, OF NEW YORK, N. Y.

BICYCLE-BRAKE.

SPECIFICATION forming part of Letters Patent No. 647,441, dated April 10, 1900.

Application filed July 28, 1899. Serial No. 725,395. (No model.)

*To all whom it may concern:*

Be it known that I, FRANK L. CLAPP, a citizen of the United States, residing at Northampton, in the county of Hampshire and State of Massachusetts, have invented certain new and useful Improvements in Bicycle-Brakes, of which the following is a specification, reference being had therein to the accompanying drawings.

This invention relates to a back-pedaling brake for bicycles.

The object of the invention is to produce a brake for bicycles which is applicable to hubs of ordinary construction without any considerable change and which will apply the brake with force when the driving-sprocket or equivalent drive-wheel is moved backward, but will not apply the brake when the pedals are still, as in coasting; and the improvement consists in certain constructions and combinations of mechanical elements, many of which elements are old in other relations.

The novel features are intended to be distinctly pointed out in the claims.

Figure 1 is a front or rear elevation of part of a wheel-hub with the brake applied. Fig. 2 is a side elevation of the hub, showing the connection which may embrace the frame. Fig. 3 is a broken vertical section of the wheel-hub with brake attached. Fig. 4 is a section of the hub, brake, and ring about on line 4 4, Fig. 1. Fig. 5 is an end elevation of the brake-levers, their ring-support, and the clutch connection which permits the hub to rotate at proper times. Fig. 6 is a side elevation of same. Fig. 7 is an elevation of the hub-driving clutch. Fig. 8 is a section or plan of the brake-levers and connection. Figs. 9 and 10 are a face view and a section of the wear-ring. Figs. 11 and 12 are a plan and an elevation of the spring-carrying locking-wedges. Fig. 13 is an elevation of a brake-lever.

The hub 1 for the rear wheel of the bicycle has bearings 2 3, in which the antifriction-balls 4 are inclosed, and the axle 5 passes through such bearings, being secured thereto by screw-thread, as is common. A toothed clutch member 6 is screwed to the wheel-hub, this clutch member having ratchet-teeth, and between the teeth are short cylinders 7, pressed outward along the outer faces of the inclines by springs 8. The clutch member 6 is inclosed in the annular or sprocket wheel 10, said sprocket-wheel having an inturned flange of a little less thickness than the clutch member 6, and the inner edge of this flange and the clutch member are inclosed between flat rings or washers 11 and 12, which fit the hub. The short cylinders 7 have their ends close to these rings, so that the wheel 6 becomes practically a part of the hub, and the clutch is arranged within the sprocket-wheel 10, as usual, so that a forward movement of the sprocket-wheel engages the clutch and causes the hub to move forward, while a backward movement of the sprocket unclutches the clutch by pushing the cylinders 7 along the outer face of teeth of wheel 6 and permits the sprocket-wheel to rotate backward without moving the clutch member 6. Therefore, the forward movement of the sprocket-wheel drives the wheel forward, while the reverse movement permits the sprocket-wheel (or it may be another than a sprocket-driver) to run loose on the hub so far as has been described. As the ring 10 drives by its inside engagement it is apparent that it is quite immaterial whether this ring is driven by the engagement of a driving-motor with teeth called "sprocket-teeth" on the exterior of said ring or whether it be driven by any other mechanism, as is common in this art.

On the hub 1 there is secured or otherwise connected a strong ring 15. This ring may be screwed onto the hub by a suitable wrench engaging notches 16 in the ring. The thread by which the ring engages the hub is cut in such direction that the application of the brake, as hereinafter described, tends to tighten the ring on the hub.

The drive-wheel 10 has its cup part 20 extending outside of and concentric with ring 15. Between this cup or ring 20 and ring 15 there is an annular space which contains brake-levers 21, preferably three or more in number. These levers are connected by pivots 22 to the bushing-ring 30, which ring neatly fits the inside of cup 20. The levers 21 are curved wedges, preferably of about the form shown. A spider or broken spring-ring 35 has pintles 36 for three short cylinders 37. The spider is of such elasticity that it will hold the cylinders 37 against the inner face of cup 20, these short cylinders being free to turn on their pintles. Now suppose the direction of rotation of cup 20 of the sprocket or driving wheel to be in the direction of the arrow, Fig. 4, the friction of the outer ring will carry the rolls 37 along up the inclines of the brake-levers 21, and thereby compress such brake-levers with a most-powerful pressure onto the ring 15. This is what happens when the sprocket-wheel 10 is driven backward by back-pedaling, the driving-clutch being uncoupled, as has been explained. As ring 15 is fast to the hub, a braking effect is at once exerted on the wheel by such back-pedaling; but when the cup 20 is reversed its movement carries the rolls 37 into the position shown in dotted lines, Fig. 8, when there is no binding of the brake-levers 21 on the ring 15.

The spider 35 is loose as regards the casing and merely holds the rolls 37 to working position and will itself yield by its elasticity and also rock about the hub or casing far enough to permit the necessary movement of rolls 37, carried on the pintles of the spider.

The bushing-ring 30 has its inner edge between the rings or washers 40 and 41, which washers surround the axle 5. A clutch member 60, similar to the member 6, is firmly connected to plates 40 41, leaving spaces outside the teeth of the clutch member in which the short cylinders 70 are pressed out by springs 80. The plate 40 has an arm 44, which by loop 45 or by other convenient connection is fastened to the frame of the machine.

If it be desirable to move the bicycle backward, the ring 30, not being locked by the clutch to clutch member 60, may rotate backward, the wheel-hub and sprocket at that time being locked together and locked to ring 30, which ring is, however, free to turn backward. The ring 30 is held to clutch member 60 at all times, except when the wheel is rotating in backward direction. When the wheel is running in forward direction, the tendency of the ring 15 on the hub, by engaging the brake-shoes, is to move or rotate the brake-shoes and ring 30 in forward direction, which forward movement is prevented by the clutch engagement between ring 30 and clutch member 60.

I am not aware of any other back-pedaling brake which permits the backward rotation of the wheel. The wheel is usually locked against such rotation, which is sometimes an inconvenience.

My brake is applicable to a large proportion of the wheel-hubs as now constructed. The brake operates quickly and noiselessly and places the wheel-brake well under control by the pedals.

What I claim is—

1. In a brake of the character described, the driving-ring and clutch connections adapted to engage with the wheel-hub as described, wedge-shaped levers inside said driving-ring and pivotally held to a support within the driving-ring, a brake-ring on the hub on which said wedge-levers may bear, and means operated by the reverse movement of the driving-ring to compress said levers on the brake-ring, all combined substantially as described.

2. In a brake mechanism of the character described, the combination with the hub, of a brake-ring fixed thereto, wedge-arms having a bearing on said ring, a spider-shaped spring, bearing-rolls in position to bear on said wedge-arms, and the driving-ring surrounding and bearing on said rolls, all combined substantially as described.

3. In a brake as described, the hub, sprocket-wheel, and intermediate clutch, the brake compressed onto the hub by the reversal of the movement of the sprocket-wheel, and a second clutch connecting said brake to the frame and releasing it and the hub when the wheel is turned backward, all combined substantially as described.

4. In a bicycle-brake mechanism, a compression-brake acting on the hub by the back pedaling of the driver, a clutch mechanism at the end of the hub and inclosed by the ring of the driver, and means for connecting one member of this clutch with the frame of the wheel, all combined substantially as described.

5. In a bicycle-brake, the hub, driving clutch member, ring-driver, and interposed driving-pieces, the wedging brake-arms acting on a part of the hub, the rolls acting on said wedging-arms and carried by a spring-piece to hold said rolls in contact with the ring-driver, a bushing-ring to which said wedging-arms are pivoted, and a clutch engaging said bushing-ring with the frame when the driving-ring is moving forward, all combined substantially as described.

6. In a back-pedaling brake, the combination with the driving-ring, of a clutch inclosed by said ring and engaging with the hub, a second clutch inclosed by the ring and engaging with the frame under conditions described, and a compression-brake engaging with the driving-ring, and acting on the hub when the driving-ring moves backward, all substantially as described.

7. In a bicycle-brake, the driving-ring, wheel-hub, and a brake operating on the hub by the back movement of the driving-ring, combined with a clutch, one member of which is permanently connected with the frame, and another member connected to the brake and free to move therewith when the wheel is rotated in backward direction, all combined substantially as described.

8. The spider in form of a broken elastic ring, and having pintles carrying rolls as 37, for use in combination with the wedge-arms and driving-ring, substantially as described.

9. The ring 30, the curved wedge-arms connected thereto, the inclosing driving-ring, and the short cylinders bearing on said arms, in combination with the brake-ring on the wheel-hub, substantially as described.

In testimony whereof I affix my signature in presence of two witnesses.

FRANK L. CLAPP.

Witnesses:
EDMUND C. MURPHY,
JOSEPH T. ELLIOTT.